May 19, 1953

C. E. KERR 2,639,076

APPARATUS FOR FILLING CONTAINERS WITH MOIST GRANULAR MATERIAL

Filed Nov. 22, 1950

Inventor
CHARLES E. KERR

By Hans G. Hoffmeister

Attorney

May 19, 1953          C. E. KERR          2,639,076
APPARATUS FOR FILLING CONTAINERS
WITH MOIST GRANULAR MATERIAL
Filed Nov. 22, 1950          2 Sheets-Sheet 2
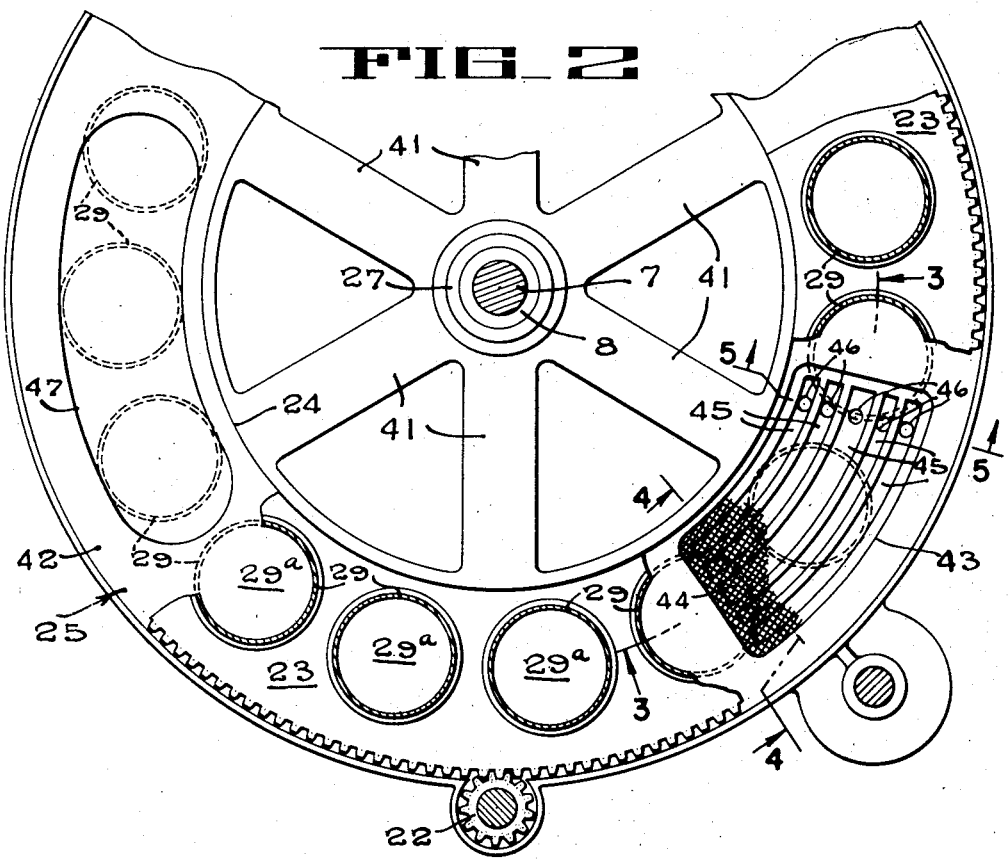
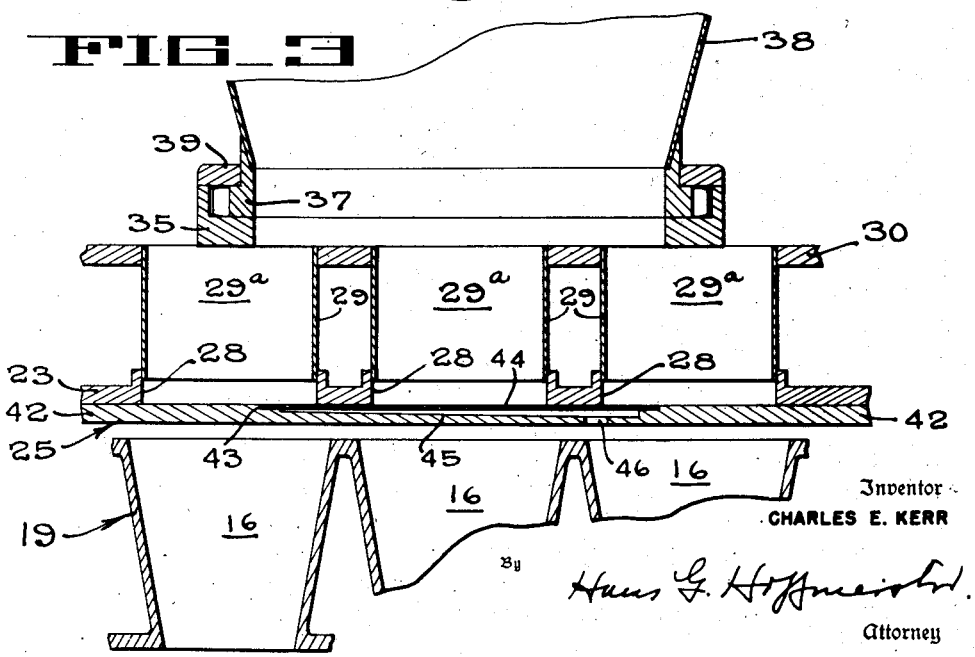
Inventor
CHARLES E. KERR
By Hans G. Hoffmeister
Attorney

UNITED STATES PATENT OFFICE 2,639,076

APPARATUS FOR FILLING CONTAINERS WITH MOIST GRANULAR MATERIAL

Charles E. Kerr, Hoopeston, Ill., assignor to Food Machinery and Chemical Corporation, San Jose, Calif., a corporation of Delaware Application November 22, 1950, Serial No. 197,098

3 Claims. (Cl. 226—102)

This invention relates to an apparatus for filling containers with moist granular material. More particularly it relates to an apparatus for filling containers with moist granular food products such as peas or beans.

In canning peas and beans, the product is delivered to the hopper of the filling machine directly from a washer. Accordingly, a substantial amount of water is entrained within the mass of peas or beans as delivered to the hopper. In presently accepted methods, the entrained liquid merely passes through the filling outlet with the product into the container or can. Under normal conditions of continuous operation, the amount of water which goes into the container is unobjectionable. However, during periodic interruption in production, the hopper outlet is sealed and the entrained liquid seeps downwardly to accumulate in the interstices of the peas or beans adjacent the hopper bottom. When operation is resumed, the mass which is discharged into the first several cans contains a high percentage of water. As a result insufficient space is left in the containers for the desired amount of brine or sauce and the pack in these containers is subnormal. Accordingly these containers must be removed from the canning line.

This situation develops even with stoppages of relatively short duration which frequently occur during a day's operation. However, idle periods have been known to be of such duration that as many as ten or twelve containers have received excess water. Improperly filled cans cannot be permitted to pass to the closing machine since the pack in such cans is substandard.

The situation is obviously undesirable. The loss in production time is evident, and the quality of the canned product must be checked constantly.

It is therefore one object of the present invention to provide an apparatus for filling containers with moist granular material which will prevent excessive discharge of water into the containers to thereby produce a superior quality pack.

It is a further object of the invention to provide an apparatus for filling containers with moist granular material through utilization of which interruptions in production are reduced to a minimum and untidy operating conditions are eliminated.

These and other objects and advantages will become apparent from the following description and the accompanying drawings in which:

Fig. 2 is a plan view, partially broken away, taken on the line 2—2 of Fig. 1.

Fig. 3 is an arcuate sectional view taken on the line 3—3 of Fig. 2.

Figure 4:
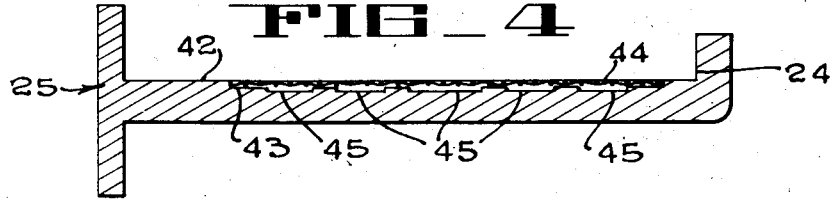
Figure 5:
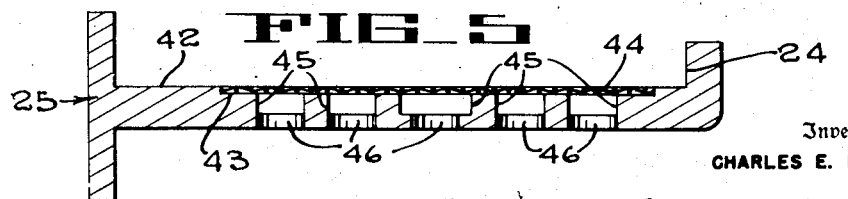

Figs. 4 and 5 are detailed sectional views of the drainage element of the present invention taken on line 4—4 and 5—5, respectively, of Fig. 2 to more clearly illustrate the construction of said element.

Figure 1:
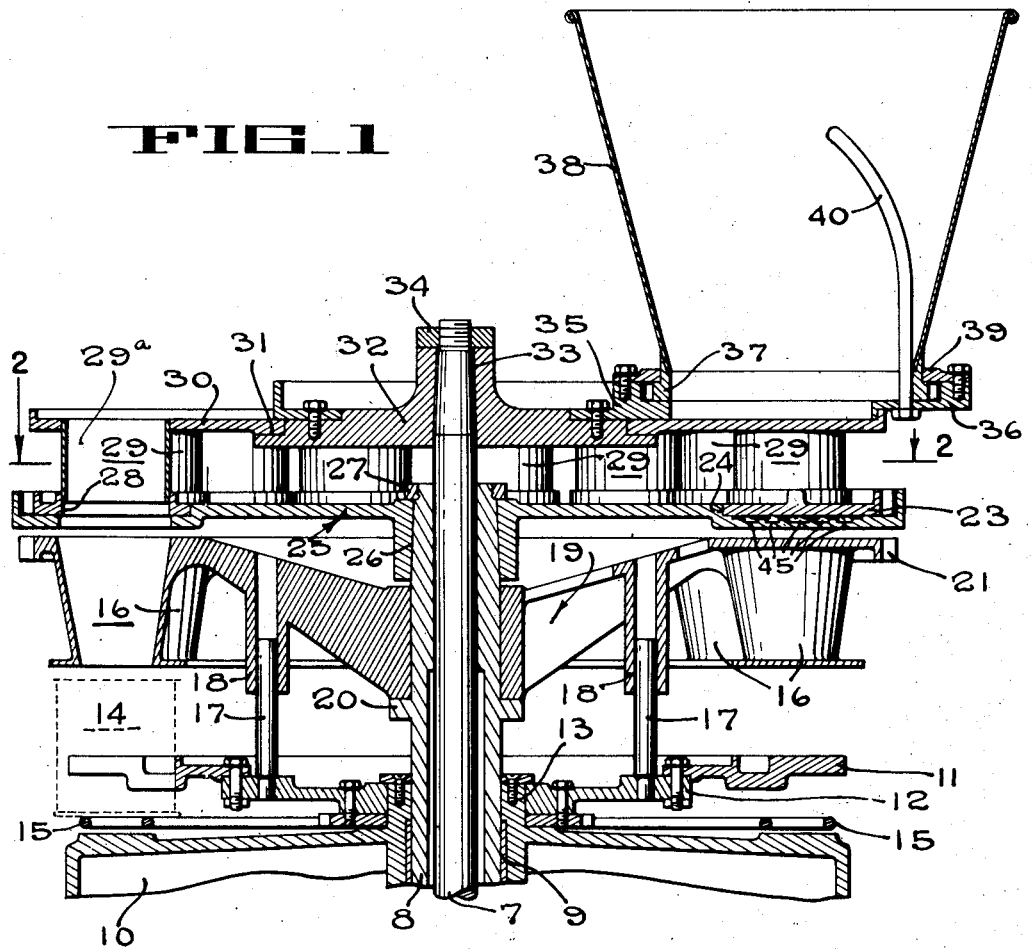
Fig. 1 is a sectional elevation of the apparatus of the present invention.

Referring to the drawings and particularly to Fig. 1 which illustrate a portion of a filling machine, 7 indicates a pedestal or post which is supported within a sleeve 8 for relative axial adjustment therein. Such axial adjustment of the post 7 is accomplished by means of a rack and pinion arrangement (not shown) in a well known manner. The sleeve 8 is slidably mounted within the central bore 9 of the base 10 of the machine for vertical adjustment relative thereto by means of a similar rack and pinion arrangement.

A feed star 11 is bolted to a feed star support plate 12 rotatably mounted on the hub 13 of the base 10 and is adapted to engage the cans or containers 14 and move them circumferentially on the track 15. To provide for synchronous movement of the containers 14 beneath filling funnels 16, a series of pins 17 on the feed star support plate 12 extend upwardly to telescopically enter bosses 18 formed integrally with the filling funnel casting 19 which rotatably engages the sleeve 8 and is supported thereon by a flange 20. The peripheral edge of funnel casting 19 is formed with gear teeth 21 for driving engagement with a spur gear (not shown).

Another spur gear 22 engages the teeth formed on the periphery of a disc-like annular casting 23 to rotate the casting within a recess 24 formed in the cut-off plate 25 which is mounted above the funnel casting 19 on the tapered upper portion 26 of the sleeve 8 and rigidly secured thereto by means of a threaded collar 27. The annular casting 23 is provided with a series of circular openings 28 which telescopically receive adaptors 29 depending from and supported by a supporting ring 30 rotatably received on the peripheral reduced portion 31 of a bearing plate 32. It will be understood that since the adaptors 29 enter the openings 28, the annular casting 23 and the supporting ring 30 rotate as a unit. The adaptors 29 with the openings 28 form a volumetric measuring pocket 29a volume of which may be varied by relative vertical movement of the cut-off plate 25 and the supporting ring 30 through the relative vertical adjustment of the sleeve 8 and the post 7.

The bearing plate 32 is affixed rigidly to the tapered upper portion 33 of the pedestal 7 by means of a threaded collar 34. An annular member 35 is bolted to the bearing plate 32 and extends over the upper edge of the supporting ring 30 to retain the latter on the bearing plate 31. An offset portion 36 of the annular member 35 is recessed to rotatably receive a circumferential seat 37 for the filling hopper 38. A retaining ring 39 prevents axial displacement of the seat 37 whose periphery is provided with gear teeth for driving engagement with a spur gear (not shown). A rod 40 is rigidly mounted on the offset portion 36 of the annular member 35 and extends upwardly into the interior of the hopper 38 to provide for stirring of the contents as the hopper 38 and its seat 37 rotate about their common axis.

Although the means for driving the hopper 38 may be dispensed with in some operations when rotation of the hopper is not necessary, it will be understood that the means for driving the annular casting 23 and the funnel casting 19 must be synchronized. Each adaptor 29 is telescoped into an opening 28 of the annular casting 23 and is in registration with a filling funnel 16 and a container 14. To preserve the relative positioning of these elements, synchronous rotation is imperative.

The cut-off plate 25, briefly mentioned hereinbefore, may now be described in detail. Since this plate and the hopper 38 do not rotate about the pedestal 7 or the sleeve 8, their positions relaive to the remaining elements vary cyclically. With particular reference to Fig. 2, the specific structure of the cut-off plate 25 can be seen to comprise a series of radially extending arms 41 formed integrally with an annular plate 42. A recess 43 in the annular plate receives an arcuate screen 44 thereover. Beneath the screen are formed a plurality of arcuate grooves 45 in the plate 25 which are upwardly inclined in the direction of travel of the adapters 29 (see Fig. 3) to provide circumferential drainage toward outlets 46 at the ends of said grooves.

Angularly spaced from the recess 43, an elongated opening 47 in the cut-off plate 25 provides an outlet from the measuring pockets 29a into the filling funnels 16 as is customary in machines of this type.

Operation

After the moist granular material which may consist of peas or beans has been placed in the filling hopper 38 and the machine placed in operation, the adaptors 29 will move successively beneath the hopper 38 (Fig. 3) to permit gravitational flow of the peas into the adaptors together with whatever water may have accumulated in the bottom of the hopper or may be entrained in the peas. Since the recess 43 is immediately underneath the volumetric measuring cups 29a as they pass the filling hopper 38, any excess water entering the measuring cups will pass through the screen 44 and flow through the arcuate grooves 45 into the outlets 46. A suitable container may be placed underneath these openings 46 to receive the drained liquid. Further rotation of the supporting ring 30 will bring the measuring cups 29a over the opening 47 in the cut-off plate 25 whereupon discharge of the granular material in said cups through a funnel 16 into a can or container 14 is effected.

Due to the fact that the recess 43 is directly beneath the hopper 38 and at least one pocket 29a is always in communication with said hopper and drainage element, drainage will continue even during those periods when the machine's operation is interrupted for some reason. Accordingly, the amount of water which can possibly be discharged into the containers is so small as to be negligible for all canning purposes. Furthermore, the complete operation will be sanitary and the subsequent brining operation can be carried out effectively without waste. The resulting canned product will be of consistently high quality.

While I have shown and described a preferred apparatus for carrying out my invention, it will be understood that the apparatus is capable of variation and modification, while still employing the principles of my invention. It is to be understood, therefore, that the scope of the invention should be limited only by the scope and proper interpretation of the claims appended hereto.

Having thus described my invention what I claim and desire to protect by Letters Patent is:

1. Apparatus for filling containers with moist granular material comprising a filling hopper adapted to be filled with granular material having water entrained therein, a drain including a foraminous element horizontally disposed beneath said hopper, a pocket, means operable to interpose said pocket between said hopper and said drain whereby a mass of granular material is deposited in said pocket and a substantial portion of said entrained water is passed through said pocket into said drain, and means for discharging said mass of granular material into the container.

2. Apparatus for filling containers with moist granular material comprising a filling hopper adapted to be filled with granular material having water entrained therein, a screen disposed beneath said hopper adapted for communication therewith, inclined grooves beneath said screen, drain outlets adjacent the end of said grooves whereby a substantial portion of the water in said hopper is drained, and means for discharging a predetermined quantity of said granular material into the containers.

3. Apparatus for filling containers with moist granular material comprising a tube adapted to receive a mass of granular material having water entrained therein and to be moved in a closed path between a material receiving station and a material discharging station; a horizontal plate disposed beneath said tube and extending along its path between the receiving and discharging station for retaining said material in said tube; a recess in said plate arranged to register with said tube in advance of said discharge station; a foraminous element disposed in said recess and arranged flush with the upper surface of said plate for draining a substantial portion of said entrained water from said mass of granular material before it is discharged into a container; a plurality of grooves in said plate beneath said foraminous element and extending in the direction of tube movement, said grooves being inclined upwardly in the direction of movement of said tube and communicating with drain outlets provided in said plate adjacent the lower end of said grooves for carrying away the water drained from said material; and means for discharging said mass of granular material into a container.

CHARLES E. KERR.

References Cited in the file of this patent

UNITED STATES PATENTS

| Number | Name | Date |
|---|---|---|
| 1,702,887 | Ayars | Feb. 19, 1929 |